United States Patent [19]

Spanier et al.

[11] Patent Number: 4,604,289

[45] Date of Patent: Aug. 5, 1986

[54] PROCESS FOR PREPARING WHOLE WHEAT BREAD AND MIX FOR SAME

[75] Inventors: Henry C. Spanier, West Milford, N.J.; Albert Spiel, Yonkers, N.Y.; Gary M. J. Rinaldo, Landing, N.J.

[73] Assignee: Nabisco Brands, Inc., Parsippany, N.J.

[21] Appl. No.: 549,419

[22] Filed: Nov. 7, 1983

[51] Int. Cl.⁴ ............................................. A21D 8/00
[52] U.S. Cl. ....................................... 426/19; 426/21; 426/62; 426/551; 426/555
[58] Field of Search ................... 426/19, 21, 23, 24, 426/26, 62, 551–555, 653.4, 804

[56] References Cited

U.S. PATENT DOCUMENTS

| | | | |
|---|---|---|---|
| 2,745,748 | 5/1956 | McCashen | 426/622 |
| 3,066,029 | 11/1962 | Jeffreys | 426/19 |
| 3,615,680 | 11/1968 | Hemika et al. | |
| 3,617,305 | 11/1969 | Rolland et al. | |
| 3,738,841 | 12/1973 | Fascans | 426/19 |
| 4,018,898 | 4/1977 | Tollefson et al. | 426/21 |
| 4,053,641 | 10/1977 | Elling | 426/19 |
| 4,393,084 | 7/1983 | Pomper | 426/19 |
| 4,395,426 | 7/1983 | Fan | 426/62 |

OTHER PUBLICATIONS

Renwick, *The Real Food Cookbook*, Zondervan Publishing House, Michigan, 1978 pp. 128-152.
Horton, *Country Commune Cooking*, Coward, McCann, & Geoghegan, Inc., N.Y., 1972, pp. 172-176 & 178-180.
Tressler, *Food Products Formulary*, vol. 2, Avil Publishing Co. Inc., Westport Connecticut, 1975 pp. 210,212,214,215,225,226,231,233.
Hitchcock, *The Washington Post*, (10-2-83) "Stone--Ground Renaissance".
Dobbins et al., *The Low Cholesterol Diet*, Doubleday & Company, Inc., N.Y. 1951, p. 74.
De Gouy, *The Bread Tray*, Greenberg, publisher; N.Y., 1944, pp. 25-26.
"The Secrets of Storage and Flavor", *The Washington Post*, (Oct. 2, 1983), pp. L1 and L2, Nature's Almost-Perfect Package and Stone-Ground Renaissance, on pp. L1 and L2.

*Primary Examiner*—Raymond N. Jones
*Assistant Examiner*—Elizabeth A. King
*Attorney, Agent, or Firm*—Richard Kornutik

[57] ABSTRACT

A quick acting whole wheat bread mix for home use and a process for preparing uniform symmetrical loaves. The essentials of the whole wheat dry mix are a fine grain flour, vital gluten and a carbohydrate mixture of dextrose and sucrose in the proper porportions. The process requires a special shaping such as the lamination technique, which is also applicable to breads other than whole wheat.

34 Claims, No Drawings

PROCESS FOR PREPARING WHOLE WHEAT BREAD AND MIX FOR SAME

BACKGROUND OF THE INVENTION

1. Field of the Invention

The invention relates to a bread mix, in particular to an improved dry bread mix for whole wheat bread. The invention also relates to a process for preparing the whole wheat bread mix which is rapid and enables the simplified production of a high quality whole wheat bread in the home.

2. Background of the Invention

In the past, baking bread in the home has been a tedious undertaking, requiring from 3½ to 5 hours. Generally, the typical procedure called for a series of dough working and fermentation steps that required mixing major additions of water, yeast and flour plus minor additions of salt, sugar and shortening. After the mixing operation, the dough was kneaded by alternately flattening and folding for at least about ten minutes. Then the yeast in the dough was fermented by placing it in a warm environment thus causing the rising of the dough and effecting the proper changes in the starch and gluten portions of the dough. This initial fermentation caused the dough to double in volume, following which the dough was then punched down, kneaded again for another two or three minutes and subjected to an intermediate fermentation, also known as a proofing step until the volume had redoubled. This large means of dough was then worked manually, divided into suitable size units for baking and placed in pans where it was proofed for about 30 minutes until its volume had again doubled. The final step was to bake the dough for about 30 minutes. As can be understood, this time-consuming procedure was a serious deterrent to the preparation of home-baked fresh bread despite its obvious appeal.

Although in more recent times new batter recipes for preparing home-baked bread requiring shorter time and effort have been developed, these receipes have failed to produce high quality breads. While these batter recipes contain excess water, chemical leavening agents and medium soft flour, a true dough is not formed. Therefore, the texture of the bread, including its resiliency and crumb characteristics, was not considered to be of high quality. It must be recognized that it is the batter form of the product which is responsible for the relatively inferior quality of the end product.

U.S. Pat. No. 3,615,680 (Henika et al.) represents an example of an improved dry mix and process for baking bread adapted to domestic needs. Henika et al. requires the use of essential gluten activating agents and maturing agents. The activating agents are present at levels which react with substantially all of the protein in the dough to achieve the desired viscosities in a short mixing period. Starch modifying agents are needed to improve flavor and dough properties. Slow acting oxidants or maturing agents are also employed. This procedure, while an improvement, is unnecessarily complex. It still requires considerable fermentation and kneading in combination with a proofing step that has to be carefully temperature controlled.

U.S. Pat. No. 3,617,305 is another example of a simplified bread mix and process. A considerable reduction in time for the kneading and fermentation steps is achieved by an additive composition containing defined amounts of an ascorbate compound, an edible oxidizing agent and an edible sulfhydryl-containing reducing agent. In certain instances either the kneading or fermentation step may be eliminated. Significantly, however, either kneading for 4 minutes or more or initial fermentation for from 15 to 60 minutes is required. Preferably also a kneading step for at least about 1 minute is practiced.

U.S. Pat. No. 4,393,084 describes what is considered to be a significant breakthrough in the preparation of a bread mix and product in that it eliminates kneading of the dough after the initial mixing and also virtually eliminates a separate step of fermenting following the mixing step. Quick preparation of a high quality bread is achieved simply by mixing flour, 1.5 to 2.5 percent of a quick-leavening active dry yeast and 0.1 to 0.75 percent of a dough conditioner which is calcium stearoyl-2-lactylate, sodium stearoyl-2-lactylate and mixtures thereof. All of such percentages are based on the dry weight of the mix.

U.S. Pat. No. 4,395,426 is another example of a bread mix for home use that eliminates both the kneading step and the fermentation step. However, while the end result achieved herein is similar to U.S. Pat. No. 4,393,084, the result is accomplished somewhat differently. U.S. Pat. No. 4,395,426 requires, in addition to flour and active yeast, a chemical leavening agent and a gum mixture of propylene glycol alginate and a second gum such as carrageenan.

While the latter two patents, namely, U.S. Pat. Nos. 4,393,084 and 4,395,426, have made notable advances in the preparation of dry mixes which enable quick production of high quality breads, neither patent suggests that its specific dry mix composition and its specific process of preparation would specifically be adequate for a high quality whole wheat bread. While U.S. Pat. No. 4,393,084 indicates that the dry mix and process are applicable to the preparation of virtually any type of bread of yeast-leavened dough product the formulations as indicated by the examples are preferably directed to white bread, French-style white bread, rye bread and pumpernickel. Similarly, U.S. Pat. No. 4,393,426 is silent about the type of bread produced by use of its bread mix composition and the process of making the same.

Several decades ago the use of whole wheat almost ceased in bread making both commercially and in the home because of well-known problems. But there has been a recent revival in the popularity of whole wheat bread.

The use of whole wheat had the problems of providing a sticky dough that was not easy to work with and dense, uneven, small loaves of bread were produced. The bran fraction of the whole wheat tended to destroy the gluten in the dough. Bran interfered with the gluten structure and was not as elastic as gluten. The use of whole wheat caused a dry mouth feel. Whole wheat flour has different absorptive properties than does refined white flour. The reason is because the bran does not absorb as much water as does gluten.

BROAD DESCRIPTION OF THE INVENTION

An object of the invention is to provide an improved dry bread mix useful for producing whole wheat bread. Another object of the invention is to provide a process for preparing such whole wheat bread mix which is rapid and enables the simplified production of a high quality whole wheat bread. It is a further objection of this invention to provide a dry mix which permits the simple preparation of bread in a very short time from addition of water to completion of baking. It is still a further object to provide a process to achieve such using such premix. It is another object of the invention to provide a dry mix and a process for simply preparing high qualith whole wheat bread to virtually eliminate any requirement for fermenting the dough after initial preparation and for kneading the dough prior to proofing. Other objects and advantages of the invention are set out herein or are obvious herefrom to one ordinarily skilled in the art.

The objects and advantages of the invention are achieved by the compositions and processes of the invention.

The invention involves a whole wheat quick baking bread mix which includes a stone-ground fine grain whole wheat flour. Preferably about 40 to about 75 percent by weight of the whole wheat flour passes through a +100 U.S. series screen. About 2 to about 10 percent by weight, based on the weight of the mix, of vital gluten is present in the mix. The mix also contains about 2 to about 3.5 percent by weight, based on the weight of the mix, of sucrose and about 2 to about 3.5 percent by weight, based on the weight of the mix, of dextrose. The ratio of dextrose to sucrose is between about 0.57 to about 1.75. Basically the invention is directed to an improved dry bread mix for whole wheat bread which preferably incorporates the advantages of using the ingredients disclosed in U.S. Pat. No. 4,393,084 for making a high quality bread in less than two hours. Broadly, the three essential advances or modifications which the invention incorporates over such patent are: (1) the use of a finer grain of whole wheat flour; (2) an increase in the vital wheat gluten level; and (3) incorporation of a proper mixture of carboyhydrates, the best results unexpectedly being obtained using dextrose and sucrose.

It is essential to the invention that the whole wheat flour be produced in a manner which provides better and more consistent absorptive properties than most modern commercial milling operations provide. The modern milling operations overwhelmingly use rotating steel plates (i.e., roller mills) with fine grooves therein. The invention prefers the use of fine stone-ground whole wheat flour over coarse stone-ground whole wheat flour. An object is to increase the surface area of the whole wheat flour because such increased surface area provides better absorptive properties—the surface is increased by using the finer whole wheat flour. Unexpectedly it was found that stone-ground whole wheat flour had more consistent absorptive properties than did whole wheat flour which was produced by the modern method of utilizing rotating plates having grooves therein. Another advantage of stone-ground whole wheat flour is that stone grinding causes far less denaturing of the protein (gluten) than does roller milling or hammer milling.

Preferably the protein content of the mix is about 11 to about 16 percent by weight, based on the weight of the mix, and most preferably it is about 14 to about 15 percent by weight, based on the weight of the mix. The desired protein level in the mix is achieved by adding to the mix about 2 to about 10 percent by weight, based on the weight of the mix, of vital wheat gluten. The use of added vital wheat gluten in the bread mix is important because the vital wheat gluten increases the supporting structure of the dough. The result is lower weight percentages of the other dry ingredients, but the resultant dough is less starchy and has an improved volume.

Preferably the weight ratio of dextrose to sucrose in the whole wheat bread mix is between about 0.8 and about 1.3. The amounts and ratios of the dextrose and the sucrose are essential so that the yeast can more easily assimilate the carbohydrates, which results in faster gas production.

The mix also contains an active yeast, usually present in an amount of about 1.5 to about 4 percent by weight, based on the weight of the mixture. Preferably the mix contains a quick-leavening active dry yeast and a dough conditioner. Preferably the mix also contains about 0.1 to about 2 percent by weight, based on the weight of the mix, of inactive dry yeast which is present for taste or flavor purposes. A particularly preferred embodiment of the whole wheat bread mix contains about 2 to about 4 percent by weight, based on the weight of the mix, of a quick-leavening active dry yeast and about 0.1 to about 0.75 percent by weight, based on the weight of the mix, of a dough conditioner which, for example, the is calcium stearoyl-2-lactylate, sodium stearoyl-2-lactylate or mixtures thereof. The preferred dough conditioner is sodium stearoyl-2-lactylate. The mix preferably also contains: about 1.0 to about 2.5 percent by weight, based on the weight of the mix, of sodium chloride; about 0.25 to about 1.5 percent by weight, based on the weight of the mix, of molasses powder; about 1 to about 5 percent by weight, based on the weight of the mix, of non-fat dry milk solids; about 0.1 to about 1.5 percent by weight, based on the weight of the mix, of diastatic malted barley flour; about 0.1 to about 0.6 percent by weight, based on the weight of the mix, of vanilla in particulate form; about 0.75 to about 3 percent by weight, based on the weight of the mix, of defatted wheat germ; and about 0.5 to about 5 percent by weight, based on the weight of the mix, of wheat starch.

The invention also includes the use of flour where it is less than 100 percent whole wheat flour. While the flour composition can contain as little as about 10 percent by weight of whole wheat flour and as much about 90 percent by weight of a flour such as white wheat flour (high or low gluten), corn flour and the like. Preferably the flour composition contains at least 50 percent by weight of whole wheat flour and the remainder (about 50 percent by weight) is white wheat flour. When such flour compositions are used dried honey flavorant can be included at about 0.5 to about 4 percent by weight, based on the weight of the mix. The lower the whole wheat content, the lower the problems caused by the whole wheat content along with a much lessened whole wheat flour taste and the like.

The invention also involves a process for preparing home-baked whole wheat bread which includes mixing water with dry whole wheat bread mix to form a dough. The dry mix includes a stone-ground fine grain whole wheat flour, about 2 to about 10 percent by weight, based on the weight of the mix, of vital gluten, about 2 to about 3.5 percent by weight, based on the weight of the mix, of sucrose, and about 2 to about 3.5 percent by weight based on the weight of the mix, of dextrose. The ratio of dextrose to sucrose is between about 0.57 to about 1.75. The dough is shaped into units for baking by using a lamination technique which comprises first flattening the dough into a sheet, twice folding the flattened dough, each fold being perpendicular (preferably) or parallel to the other, flattening the laminated dough again and then rolling the laminated dough into the shape of a cylinder. The shaped dough unit is proofed and the proofed dough unit is then baked. The specific amounts and ranges of the whole wheat premix are applicable to the invention process.

The invention process includes the described lamination technique which produces an even better consistency in volume than that of the breads disclosed in U.S. Pat. No. 4,393,084. Moreover, the invention technique is not limited to whole wheat bread, but is applicable to all types of breads, such as white, rye and French bread.

The dry mix and process of the invention are applicable to the preparation of whole wheat breads or yeast-leavened whole wheat products. The flour must be stone-ground whole wheat flour in order to achieve the advantages of the invention.

DETAILED DESCRIPTION OF THE INVENTION

In the preparation of whole wheat bread by the formulation of U.S. Pat. No. 4,393,084, it was noted that several problems occurred. After the dough was formed, it was noted that it was unusually sticky so that the homemaker had to continually dust the hands as well as sprinkle the work surface with powder more than is usually the case. It is known that whole wheat flour particularly, because of the bran, has different absorptive properties than other types of flours. The power of whole wheat flour to absorb water is much less than that of the other flours used in dry bread mixes and this accounts in part for the stickiness of the dough. Whatever the reason, however, it is obvious that problems in handling could be a potentially severe deterrent to people who desire to make whole wheat bread, particularly novices. Additionally small uneven breads were produced that had a propensity to be too dense. While not bound by any theory as to the reason for this occurrence, it is believed that the gluten which normally enhances plasticity and retains the bubbles of gas formed by the yeast was being destroyed by the whole wheat fraction, that is, the bran. It was also observed that these breads had a dry mouth feel and there was a slight limpiness, the latter attributed to the presence of molasses and honey normally present in whole wheat bread.

It has now been discovered that in addition to the combination of ingredients used in the preparation of a dry mix as disclosed in U.S. Pat. No. 4,393,084 there are three essentials for the preparation of a high quality whole wheat bread. In its broadest aspects: (1) the flour must be of a fine grain; (2) the vital wheat gluten level must be at a high level; and (3) there must be incorporated a proper mixture of dextrose and sucrose.

With regard to the process of the invention, it has been discovered that a special lamination technique for shaping the dough formed by the dry mix and water promotes a better consistency in volume and this latter technique is applicable to white, rye and French white bread as well as whole wheat bread.

The pertinent portions of the disclosure of U.S. Pat. No. 4,393,084 is incorporated herein by reference. U.S. Pat. No. 4,393,084 teaches a dry mix and a process which enable the quick preparation of high quality bread. The dry mix is characterized by its ability to form a high quality bread in less than two hours, and preferably in less than about 90 minutes. In its broad aspects, the mix requires the presence of flour, 1.5 to 2.5 percent of quick-leavening active dry yeast and 0.1 to 0.75 percent of a dough conditioner which is either calcium stearoyl-2-lactylate or sodium stearoyl-2-lactylate. The combined action of the ingredients in the simplified bread formula permits the elimination of the fermentation and kneading steps directly following the mixing of the bread mix with water. This permits a simplified process which includes mixing the dry mix with water to form a dough, shaping the dough for baking, proofing the units for from about 30 to about 45 minutes, and baking the dough.

The dry mix of the invention has specific application to the preparation of a 100 percent whole wheat bread (and breads having lesser percentages of whole wheat), while the process known as the lamination technique is universal and applies to all breads.

The whole wheat flour used in the invention in particular must be ground to a very fine grain. The finer grain whole wheat flour increases the absorptive properties because of the increased surface area. Preferably 40 to 75 percent of the stone-ground whole wheat flour passes through a +100 U.S. series sieve (sieve opening is 0.0059 inch). It is essential to the invention that the whole wheat flour be produced in a manner which provides better and more consistent absorptive properties than most modern commercial milling operations provide. The modern milling operations overwhelmingly use rotating steel plates (i.e., roller mills) with fine grooves therein. The invention prefers the use of fine stone ground whole wheat flour over coarse stone ground whole wheat flour. An object is to increase the surface area of the whole wheat flour as such provides better absorptive properties—the surface area is increased by using the finer whole wheat flour. Unexpectedly, it was found that stone ground whole wheat flour had more consistent absorptive properties than wheat flour produced by the modern method utilizing rotating plates having grooves therein. Another advantage of stone ground whole wheat flour is that stone grinding causes far less denaturing of the protein (gluten) than does roller milling or hammer milling.

By fine grinding the whole wheat flour by means of stone grinding, the surface area of the flour is increased to a magnitude which is considerably higher than the flours used in U.S. Pat. No. 4,393,084. The use of conventional equipment having two rotating fine stone cylinders produces a fine grained flour of the desired surface area having excellent absorptive properties. Stone grinders provide much more consistent absorptive properties and much less denaturization of the protein, that is, the gluten, than is the case with hammer mills and roller mills. The article entitled "The Secrets of Storage and Flavor", *The Washington Post*, (Oct. 2, 1983), p. L1, stated that roller mills are the only type used today by the large commercial mills and produce ground endosperm to a much finer consistency. This directs one away from the use of stone grinding to get very fine flour particles. Page L2 of the article states: "Stone-ground flour comes out with larger, coarser particles, accompained by some germ and bran, even in white flour. Finer particles absorb liquid more quickly. Bran and germ are heavier and absorb little liquid at all." The fine stone-ground whole wheat flour used by the invention surprisingly has consistent water absorption throughout the flour.

Whole wheat flour contains the wheat bran, wheat germ and endosperm of the wheat kernels. Some people prefer the full-grain flavor and the fiber of full-grain wheat over refined white bread, but such flour has oils herein that tend to grow rancid and cannot be stored as long as the more refined white wheat flour. Surprisingly, the stone-ground whole wheat flour premixes of the invention in packaged form are quite stable over a long period of time.

Whole wheat bread was replaced quite a few years ago because whole wheat flour had much shorter shelf and storage life than white wheat flour. Stone grinding was also replaced by roller mills because the flour produced by the latter process was lighter, the latter process was more efficient and millstones frequently had to be sharpened.

The type of wheat flour employed should be selected with particular regard for its vital gluten content. The vital gluten (protein) content is of great significance and the flour so selected should have 11 to 16 percent by weight of protein and preferably have 14 to 15 percent by weight of protein. White bread flour usually has 11 to 11.5 percent by weight of protein and high protein white flour has about 14.5 percent by weight of protein. Wheat flours of lower vital gluten content can be used, provided that the mixes are fortified with vital wheat glutens. In such a case, additional vital wheat gluten in the amount of 2 to 14 percent by weight can be added directly to the flour to compensate for the protein deficiency. The use of added vital wheat gluten in the bread mix is important because the vital wheat gluten increases the supporting structure of the dough. The result is lower weight percentages of the other dry ingredients, but the resultant dough is less starchy and has an improved specific volume.

As a final component of the whole wheat bread mix, a mixture of dextrose and sucrose is incorporated in the mix. While sugar has been considered an optional component in most bread mixes including U.S. Pat. Nos. 4,393,084 and 4,395,426, none of such references have recognized the significance of using the combination of dextrose and sucrose in specific amounts and in specific ranges. U.S. Pat. No. 4,393,084, at col. 7, lines 24 to 27, lists sucrose and dextrose (so does U.S. Pat. No. 4,395,426) but does not mention using them together, or in specific amounts or ratios, and does not mention that proper ratios and amounts of them help assimilation of them by yeast for rapid gas production. Preferably, the dextrose to sucrose in the whole wheat mix is between about 0.8 to about 1.3. The amounts and ratio of the dextrose and the sucrose are essential so that the yeast can more easily assimilate the carbohydrates, which results in faster gas production.

In addition to the three essential factors as discussed above there are a number of optional ingredients that can be added or deleted to improve the harsh grainy flavor of the whole wheat bread mix. These options include defatted wheat germ, malted barley flour and a natural flavorant such as natural vanilla powder. It has been found that these optional ingredients produce a sweet nutty whole grain flavor note. Another option that has proved advantageous is the substitution of butter or margarine for the dry shortening used in U.S. Pat. No. 4,393,084. The butter is superior to dry shortening in improving the volume and crumb structure. For example, butter and/or margarine can be used up to about 6 percent by weight of the dry mix. The preferred version of the invention mix (have 100 percent whole wheat or a very high percentage thereof) has eliminated honey and reduced the amount of molasses. The elimination of honey and reduction in molasses reduces the limpiness and in combination with added ingredients such as defatted wheat germ, dextrose, and malted barley flour the harsh grainy flavor is replaced by a mellow, sweet, whole grain flavor note. These additives further contribute to a delightfully moist bread with good textural qualities.

Among the advantages of the invention is the enablement of production of a whole wheat bread of high quality which avoids the difficulties mentioned above. The use of a finer grained flour improves the absorptive properties and thus obviates the stickiness of the prepared dough. The increase of the vital gluten level not only functions to obviate the stickiness of the dough but also improves the volume. The result is larger more even bread of less density and improved texture.

The process of the invention comprises mixing water with the dry mix to form a dough, the dry mix is of the type described above which includes a fine grained stone ground whole wheat flour. The novelty of the process includes the particular shaping of the dough. Unlike the procedure in U.S. Pat. No. 4,393,084 where the dough is merely flattened into a sheet and simply rolled into a cylinder, the technique is modified in the invention process so that after flattening, the dough is folded over twice, rolled out again and then shaped into a cylinder. This simple variation of the shaping procedure has been found to produce a more consistent volume and better loaf symmetry. The invention process provides even better consistency in volume and particularly loaf symmetry without the need for conventional additives, such as, soy flour, which are usually added for such purposes. The invention process achieves such by the control provided by the lamination technique, thereby allowing the attainment of 100 percent whole wheat bread loaves.

The lamination technique of the invention is also applicable in general to all dry bread mixes (e.g., wheat, rye and French) meant for the home as well as the dry whole wheat bread mixes of the invention.

The invention avoids two of the most prevalent causes for failure in bread preparation by novices, namely, improper yeast rehydration and variation in flour quality. The employment of a combination of a particular type of yeast and a particular class of dough conditioners at important levels helps avoid such problems. The yeast is of a type, activity and dispersibility which permits its incorporation into the dough by simple mixing to provide a uniform dispersion at a high level without the typically-associated textural graininess and spotted appearance to the crust when other types of yeast at similar levels are employed. According to the invention, the yeast need not be separately rehydrated, but is preferably hydrated simply by the mixing of the dry mix with hot tap water. Combining this feature with the use of dough conditioners which are selected to achieve rapid hydration of the dough yet permit easy mixing and suitable strengthening of the dough to entrap evolved $CO_2$, helps to eliminate the usual difficulties encountered with variations in flour quality which may otherwise cause gross variations in final bread quality following a standardized process. It should be noted at this time that much of the problems with variations in flour quality are eliminated in the invention by the use of stone ground whole wheat.

The yeast employed in the invention can be a quick-leavening active dry yeast. Yeasts of this type are characterized by a relatively high protein content, preferably from about 40 to about 60 percent; a small uniform particle size, preferably on the order of from about 0.2 to about 2.0 millimeters in diameter; and a relatively low moisture content, typically on the order of from about 3 to about 8 percent, perferably from about 4 to about 5 percent. Perferably, yeasts of this type contain minor amounts, e.g., from 0.5 to 2 percent of a surface-active agent such as polysorbate 60, or diacetyl esters of fully-saturated vegetable oils, and a minor amount, e.g., from 0.5 to 1 percent, of a stabilizer such as carboxymethlycellulose, and other hydrophilic colloids, which are employed in the formation of the dispersion of yeast to achieve the desired low moisture content upon drying but yet permit rapid rehydration. One process for preparing a quick-leavening active dry yeast is described in U.S. Pat. No. 3,843,800. Another procedure for preparing the quick-leavening active dry yeast is described in Canadian Pat. No. 1,075,077.

The proper leavening within the short period of time contemplated by the invention usually requires the use of at least 1.5 and up to 2.5 percent of quick-leavening active dry yeast in the formulation. Preferred levels are within the range of from about 1.65 to about 2.15 percent, based on the weight of the mix. It has been found that the levels lower than these minima may not provide the desired leavening while levels above these maxima may impart a noticeable yeasty off flavor. To achieve the necessary leavening, it is important that the yeast be of the quick-leavening type described above or there will be insufficient volume in the final product. Even with these levels of a suitably active yeast, it is important that the yeast be readily dispersible uniformly throughout the dough with minimal mixing. This also makes it important to the use of quick-leavening active dry yeast as defined above. The conditions under which the yeast is dried, the noted additives and the particle size of the quick-leavening active dry yeast are believed important to provide the desired degree of dispersibility.

The presence of a dough conditioner which is calcium stearoyl-2-lactylate, potassium stearoyl-2-lactate, sodium stearoyl-2-lactylate and mixtures thereof is important to the composition of the bread mix of the invention. Broadly, any suitable dough conditioner can be used and preferably the dough conditioner is a sodium, calcium or potassium salt of an acyl-lactylate of $C_{14}$–$C_{22}$ fatty acids, or ethoxylated mono- and diglycerides of $C_{14}$ to $C_{18}$ fatty acids, or mixtures thereof. A useful dough conditioner is a mixture of sodium and calcium stearoyl-2-lactylate with more than one monoglyceride. The dough conditioner should be present at a level of from 0.1 to 0.75 percent based on the weight of the mix. The preferred level of the dough conditioner is about 0.4 to about 0.6 percent.

Calcium stearoyl-2-lactylate and sodium stearoyl-2-lactylate are well-known for use in yeast-leavened doughs and are believed to somehow complex with the protein of bread doughs, forming cross linkages between protein platelets and their adjacent sheets. In this manner, these dough conditioners provide broad tolerance in dough mixing times, improve the hydration of the dough, improve dough handling and also strengthen the doughs so that poor or weak flours will perform better. Such effects were studied and reported upon by William H. Knightly in "The Evolution of Softners and Conditioners Used in Baked Foods", *The Bakers Digest*, (October 1973), pages 64 to 75, and V. A. DeStefanis in "Binding of Crumb Softeners and Dough Strengtheners During Bread Making", *Cereal Chemistry*, (January-February 1977), pages 13 to 24. One preferred type of sodium stearoyl-2-lactylate is sold under the registered trademark "Emplex" and is described by the manufacturer as being prepared by the reaction of stearic acid and lactic acid followed by the conversion to the sodium salt. Such product is indicated to have the following analytical specifications; acid value, 60 to 80; ester number, 150 to 190; and sodium content, 2.5 to 5.0 percent.

Preferably the dough is permitted to rest for a period of from about 3 to less than 15 minutes, preferably from 5 to 10 minutes after mixing and before shaping. While some fermentation of the quick-leavening active dry yeast does occur during this period, this resting step is not primarily for the purpose of fermenting which, according to the prior art procedures, has entailed extended periods of time of up to several hours, but is primarily for the purpose of permitting the moisture within the dough to more uniformly hydrate the dry ingredients to enable less troublesome shaping of the dough into units of the desired size and shape for baking. The sodium or calcium stearoyl-2-lactylate dough conditioner is advantageously performing its function during the rest period, by enhancing the hydration and strengthening the dough.

An advantage of the invention resides, however, in the fact that where an extended period of time for the rest period is required to coordinate the baking of the bread with other activities in the kitchen or for any other reason, that additonal resting time will not adversely affect the quality of the bread produced.

The combination of the specific level of the quick-leavening active dry yeast and the sodium or calcium stearoyl-2-lactylate dough conditioners helps provide a simplicity in processing and a consistency in results which is quite surprising. By the use of the combination in a dry bread mix according to the invention, whole wheat bread can be prepared by a highly simplified process which eliminates kneading of the dough after initial mixing and virtually eliminates a separate step of fermenting following the mixing step.

After the rest period, the dough will have achieved the proper uniform hydration and texture to permit it to be shaped into suitably-sized portions for baking. The thus suitably-portioned dough can be ready for proofing after only from about 15 to 25 minutes after initially starting the mixing. And, except for the baking pan or sheet, the baker can begin cleanup.

Similarly, kneading the dough after mixing is not required when employing the bread mix of the invention because the simple mixing followed by the rest step, wherein the dough is uniformly hydrated and strengthened by the dough conditioner is sufficient to provide a high quality bread product. The dispersibility of the yeast, combined with its quick-leavening activity at the high level employed and the dough strengthening effect of the dough conditioner, enable the rapid achievement of the suitable dough characteristics to permit good gas retention during a relatively short final proof on the order of from about 30 to 45 minutes, perferably about 40 minutes. Thus, the invention eliminates any requirement for kneading as conventionally performed in prior art by vigorously working, such as by alternately folding and flattening the dough. The rapid, uniform dispersibility of the yeast within the dough by simple mixing, followed by the resting period wherein the sodium or calcium stearoyl-2-lactylate dough conditioner and water act in concert to hydrate the dough and strengthen it sufficiently to retain gas, as it is later developed during proofing, are effective without any kneading. However, where desired by a particular baker, or due to a mistake in shaping the dough into the desired size, extended periods of working the dough in a manner similar to conventional kneading will not adversely affect the final quality of the bread.

The proper mixture of dextrose and sucrose produces a faster gas production because the combination is more easily assimilable by the yeast. Faster gas production improves fermentation time and thus further aids in production of a bread in quick time.

The yeast is preferably packaged separately from the other ingredients of the dry bread mix and is blended with them prior to adding the water. The water is then simply added and the combined mixture is stirred briskly until the dough becomes stiff and most of the flour has been mixed in.

The water added to the dry ingredients to form the dough is preferably tap water at a temperature within the range of from about 100° to 140° F. This permits, in a typical formula for preparing a single loaf of bread, the addition of about 240 milliliters of water (1 cup) to from about 350 to about 400 grams of dry mix, to achieve an ideal temperature for activating the yeast of within the range of from about 85° to 100° F. The temperature of the final dough is brought to a temperature within this range simply by the addition of hot tap water. Typically, the hottest available tap water can be used with good results.

The suitable-portioned dough is placed in a warm, covered environment for a period of from about 30 to about 45 minutes for proofing. The ambient temperature should be within the range of from about 80° to about 120° F., but a wide tolerance is possible. Where a lower temperature is employed, say on the order of 70° F., the proofing time will be somewhat longer, but it will still be possible to stay within the two-hour time limit for the complete preparation. Higher temperatures are of no advantage and may decrease yeast activity. Preferably, a proofing time of about 40 minutes will be employed. Thus, the baker can have all utensils except, for that used to hold the dough during proofing, cleaned up; and he can have the oven preheated to the proper temperature for baking—well in advance of the time at which the dough should be placed in the oven for baking. Baking is then done in conventional fashion at a temperature within the range of from about 375° to about 425° F., preferably about 400° F. Typical baking times will be on the order of from about 30 to about 35 minutes, depending upon the size and shape of the dough portion.

The invention process for preparing a whole wheat bread is similar to that described in U.S. Pat. No. 4,393,084 in that the water is added to the mix to form a dough which is then shaped. It is in the shaping that the process differs. While the change may appear to be modest, nevertheless it produces a notably advantageous result in that there is more uniformity in the loaves produced by the invention process. Concurrently with this uniformity there is improved loaf symmetry. These features improve the appearance of the bread and give it greater eye appeal. The so-called lamination technique of the invention requires that after rolling out the dough flat it is folded over twice—each fold being perpendicular or parallel to the other. Then this folded dough is flattened again and rerolled into a cylinder. Of course, the invention process is not confined to whole wheat bread and may be practiced on white, rye, and French white bread as well.

The whole wheat bread produced by the invention process is moist and has a clean taste. The breads produced by the prior art have a feedy taste, are dry and are denser, lower volume loaves.

As usual herein, all parts, ratios, proportions and percentages are on a weight basis, unless otherwise stated herein or otherwise obvious herefrom to one ordinarily skilled in the art. Also as used herein, all parts and percentages are based upon the total weight of the formulation at the indicated stage in processing, unless otherwise stated herein or otherwise obvious herefrom to one ordinarily skilled in the art. The following examples are presented for the purpose of further illustrating and explaining the invention and are not to be taken as limiting in any regard.

EXAMPLE 1

Whole wheat bread according to the invention is prepared from the following ingredients:

| Ingredients | Percent Based On Dry Weight | Grams |
|---|---|---|
| Whole Wheat Flour, Stone Ground, (Fine #1, Hi Protein) | 79.6870 | 285.0 |
| Salt, Bakers (NaCl) | 1.6776 | 6.0 |
| Sodium Stearoyl-2-lactylate[1] | 0.3914 | 1.4 |
| Molasses Powder | 0.6990 | 2.5 |
| Vital Wheat Gluten | 5.3125 | 19.0 |
| Inactive Dry Yeast[2] | 0.5592 | 2.0 |
| Fruit Granulated Sugar (Sucrose) | 2.7960 | 10.0 |
| Spray Process Non-Fat Dry Milk Solids | 2.7960 | 10.0 |
| Malted Barley Flour (diastatic) | 0.5592 | 2.0 |
| Pure Vanilla Powder | 0.2097 | 0.75 |
| Defatted Wheat Germ | 1.3980 | 5.0 |
| Wheat Starch | 1.1184 | 4.0 |
| Dextrose | 2.7960 | 10.0 |
| TOTAL | 100.0000 | 357.65 |

Notes:
[1]Emplex
[2]Fleischmann, Type 7B

The mix also contained 10 grams (or 2.796 percent based on the mix dry weight) of quick-leavening active dry yeast.

The quick-leavening active dry yeast, which is packaged separately from the remainder of the ingredients, was blended with the other dry ingredients in a bowl to which was added one cup (240 ml) of hot tap water. The water and the dry ingredients were stirred briskly until the dough became stiff and most of the flour was mixed in. Then, with lightly floured hands, the dough was folded and turned in a bowl to pick up the remaining flour mixture. After this, the dough was permitted to rest for 5 minutes. Following resting, the dough was taken from the bowl with floured hands and set on a lightly-floured surface where it was shaped into a smooth ball and then flattened by pushing and patting the dough into a rectangle of about 8 to 10 inches in dimensions. The dough was then turned over and again flattened into a smooth sheet. After this flattening, the dough was folded over twice, each fold being perpendicular to the other. Then the dough was flattened again and rolled into a cylindrical form in the manner of a jelly roll. The free edge along the length of the roll was then sealed by pinching to form a seam. The roll of dough was then placed seam side down in a greased 8½×4½×2½ inch loaf pan, covered with a dish towel, and placed in a warm draft-free area (about 86° F.) for about 40 minutes to allow the dough to rise. Meanwhile, the oven was preheated to 400° F. After the 40-minute proofing period, the towel was removed and the dough was baked at 400° F. for about 30 to 35 minutes until the crust was golden brown. The resultant loaf showed good loaf volume. The whole wheat was smooth and even, had a good mouth feel, had a fine texture, was pleasantly moist, and the flavor was mellow with a sweet, nutty whole grain note.

EXAMPLE 2

Example 1 was repeated except that calcium stearoyl-2-lactylate was used in place of sodium stearoyl-2-lactylate. The resultant whole wheat bread had the same properties.

EXAMPLE 3

Example 1 was repeated, except that the whole wheat bread according to the invention was prepared from the following ingredients:

| Ingredients | Percent Based On Dry Weight | Grams |
|---|---|---|
| Whole Wheat Flour, Stone Ground, (Fine #1, Hi Protein) | 40.6557 | 155.0 |
| Hi Gluten White Flour | 40.6557 | 155.0 |
| Salt, Bakers (NaCl) | 1.5738 | 6.0 |
| Sodium Stearoyl-2-lactylate[1] | 0.3934 | 1.5 |
| Honi Bake Powder[3] | 2.0983 | 8.0 |
| Vital Wheat Gluten | 3.1475 | 12.0 |
| Inactive Dry Yeast[2] | 0.5246 | 2.0 |
| Fruit Granulated Sugar (Sucrose) | 2.6230 | 10.0 |
| Spray Process Non-Fat Dry Milk Solids | 2.6230 | 10.0 |
| Malted Barley Flour (diastatic) | 0.5246 | 2.0 |
| Pure Vanilla Powder | 0.1967 | 0.75 |
| Defatted Wheat Germ | 1.3115 | 5.0 |
| Wheat Starch | 1.0492 | 4.0 |
| Dextrose | 2.6230 | 10.0 |
| TOTAL | 100.0000 | 357.65 |

Notes:
[1]Emplex
[2]Fleischmann, Type 7B
[3]Dehydrated (dried) honey

The mix also contained 10 grams (or 2.796 percent based on the mix dry weight) of quick-leavening active dry yeast. A whole wheat bread with a honey flavor was obtained.

Although the above examples illustrate various embodiments for practicing the invention, it should be understood that the invention is not limted thereto and that various changes and modifications may be made therein without departing from the scope of the invention.

What is claimed is:

1. Whole wheat bread mix characterized by its ability to form a high quality whole wheat bread in less than two hours from addition of water to completion of baking, comprising:
   (a) a stone-ground fine grain whole wheat flour, 40 to 75 percent by weight of the whole wheat flour passing through a +100 U.S. series mesh screen;
   (b) about 2 to about 10 percent by weight, based on the weight of the mix, of added vital gluten;
   (c) about 2 to about 3.5 percent by weight, based on the weight of the mix, of sucrose;
   (d) about 2 to about 3.5 percent by weight based on the weight of the mix, of dextrose, the ratio of dextrose to sucrose being between about 0.57 to about 1.75;
   (e) about 1.5 to about 4 percent by weight, based on the weight of the mix, of a quick-leavening active dry yeast; and
   (f) about 0.1 to about 0.75 percent by weight based on the weight of the mix, of a dough conditioner selected from the group consisting of calcium stearoyl-2-lactylate, sodium stearoyl-2-lactylate and a mixture of at least two of said lactylates.

2. Whole wheat bread mix characterized by its ability to form a high quality whole wheat bread in less than two hours from addition of water to completion of baking, comprising:
   (a) a stone-ground fine grain whole wheat flour;
   (b) about 2 to about 10 percent by weight, based on the weight of the mix, of added vital gluten;
   (c) about 2 to about 3.5 percent by weight based on the weight of the mix, of sucrose;
   (d) about 2 to about 3.5 percent by weight based on the ratio of dextrose to sucrose being between about 0.57 to about 1.75;
   (e) about 2 to about 4 percent by weight, based on the weight of the mix, of a quick leavening active dry yeast; and
   (f) about 0.1 to about 0.75 percent by weight, based on the weight of the mix, of a dough conditioner selected from the group consisting of calcium stearoyl-2-lactylate, sodium stearoyl-2-lactylate, potassium stearoyl-2-lactylate and a mixture of at least two of said lactylates.

3. The whole wheat bread mix as claimed in claim 2 wherein the dough conditioner is sodium stearoyl-2-lactylate.

4. The whole wheat bread mix as claimed in claim 2 wherein the protein content of the mix is about 11 to about 16 percent by weight, based on the weight of the mix.

5. The whole wheat bread mix as claimed in claim 2 wherein the protein content of the mix is about 14 to about 15 percent by weight, based on the weight of the mix.

6. The whole wheat bread mix as claimed in claim 2 wherein the mix also contains about 2 to about 10 percent by weight, based on the weight of the mix, of vital wheat gluten.

7. The whole wheat bread mix as claimed in claim 2 wherein the weight ratio of dextrose to sucrose is between about 0.8 to about 1.3.

8. The whole wheat bread mix as claimed in claim 2 wherein the mix also contains about 0.1 to about 2 percent by weight, based on the weight of the mix, of inactive dry yeast.

9. The whole wheat bread mix as claimed in claim 2 wherein the mix also contains about 1.0 to about 2.5 percent by weight, based on the weight of the mix, of sodium chloride.

10. The whole wheat bread mix as claimed in claim 2 wherein the mix also contains about 0.25 to about 1.5 percent by weight, based on the weight of the mix, of molasses powder.

11. The whole wheat bread mix as claimed in claim 2 wherein the mix also contains about 1 to about 5 percent by weight, based on the weight of the mix, of non-fat dry milk solids.

12. The whole wheat bread mix as claimed in claim 2 wherein the mix also contains about 0.1 to about 1.5 percent by weight, based on the weight of the mix, of diastatic malted barley flour.

13. The whole wheat bread mix as claimed in claim 2 wherein the mix also contains about 0.1 to 0.6 percent by weight, based on the weight of the mix, of vanilla in particulate form.

14. The whole wheat bread mix as claimed in claim 2 wherein the mix also contains about 0.75 to about 3 percent by weight, based on the weight of the mix, of defatted wheat germ.

15. The whole wheat bread mix as claimed in claim 2 wherein the mix also contains about 0.5 to about 5 percent by weight, based on the weight of the mix, of wheat starch.

16. The whole wheat bread mix as claimed in claim 2 wherein the flour in the mix is entirely whole wheat flour.

17. The whole wheat bread mix as claimed in claim 2 wherein the flour in the mix is at least 90 percent by weight, based on the weight of the mix, whole wheat flour.

18. Process for preparing home-baked whole wheat bread which comprises: mixing water with a dry bread mix to form a dough, the dry mix including a stone-ground fine-grain whole wheat flour, about 2 to about 10 percent by weight, based on the weight of the mix, of added vital gluten, about 2 to about 3.5 percent by weight, based on the weight of the mix, of sucrose, about 2 to about 3.5 percent by weight based on the weight of the mix, of dextrose, the ratio of dextrose to sucrose being between about 0.57 to about 1.75, about 2 to about 4 percent by weight, based on the weight of the mix, of a quick-leavening active dry yeast, and about 0.1 to about 0.75 percent by weight, based on the weight of the mix, of a dough conditioner selected from the group consisting of calcium stearoyl-2-lactylate, sodium stearoyl-2-lactylate and a mixture of at least two of said lactylates; shaping the dough into units for baking by using a lamination technique which consisting of first flattening the dough into a sheet, twice folding the flattened dough, each fold being perpendicular or parallel to the other fold, flattening the laminated dough again and then rolling the laminated dough into the shape of a cylinder; proofing the shaped dough units; and baking the proofed dough units; said process not including any fermentation step.

19. The process as claimed in claim 18 wherein the dough is rested for a period of from 3 to less than 15 minutes after mixing and before shaping.

20. The process as claimed in claim 18 wherein the temperature of the water is within the range of from about 100° to about 140° F.

21. The process as claimed in claim 18 wherein about 240 ml of water is added to from about 350 to about 400 grams of dry mix.

22. The process as claimed in claim 18 wherein the ambient temperature during proofing is within the range of from about 80° to about 120° F.

23. The process as claimed in claim 18 wherein the step of mixing the water with the dry bread mix is terminated upon adherence of substantially all of the flour to the resulting dough, and the dough is immediately rested without kneading to permit the dry ingredients to hydrate.

24. The process as claimed in claim 18 wherein the protein content of the mix is about 11 to about 16 percent by weight, based on the weight of the mix.

25. The process as claimed in claim 18 wherein the protein content of the mix is about 14 to about 15 percent by weight, based on the weight of the mix.

26. The process as claimed in claim 18 wherein the mix also contains about 2 to about 10 percent by weight, based on the weight of the mix, of vital wheat gluten.

27. The process as claimed in claim 18 wherein the weight ratio of dextrose to sucrose is between about 0.8 to about 1.3.

28. The process as claimed in claim 18 wherein the mix also contains about 0.1 to about 2 percent by weight, based on the weight of the mix, of inactive dry yeast.

29. The process as claimed in claim 18 wherein about 2 to about 4 percent by weight, based on the weight of the mix, of a quick-leavening active dry yeast and about 0.1 to about 0.75 percent by weight, based on the weight of the mix, of a dough conditioner selected from the group consisting of calcium stearoyl-2-lactylate, sodium stearoyl-2-lactylate and mixtures thereof.

30. The process as claimed in claim 18 wherein about 4 to about 8 percent by weight, based on the weight of the mix, is butter.

31. The process as claimed in claim 18 wherein the mix also contains about 15 to about 2.5 percent by weight, based on the weight of the mix, of sodium chloride, about 0.25 to about 1.5 percent by weight, based on the weight of the mix, of molasses powder, about 1 to about 5 percent by weight, based on the weight of the mix, of non-fat dry milk solids, about 0.1 to about 1.5 percent by weight, based on the weight of the mix, of diastatic malted barley flour, about 0.1 to about 0.6 percent by weight based on the weight of the mix, of vanilla in particulate form, about 0.75 to about 3 percent by weight, based on the weight of the mix, of defatted wheat germ, and about 0.5 to about 5 percent by weight, based on the weight of the mix of wheat starch.

32. The process as claimed in claim 18 wherein the flour in the mix is entirely whole wheat flour.

33. The process as claimed in claim 18 wherein each fold of the dough is made perpendicular to the other fold.

34. The whole wheat bread in loaf form produced by the process of claim 18.

* * * * *